US005159538A

United States Patent [19]

Wells et al.

[11] Patent Number: 5,159,538

[45] Date of Patent: Oct. 27, 1992

[54] FUSE EJECTOR GUARD AND TERMINAL SHIELD

[75] Inventors: Stephen Wells, Lawrenceville; Bruce D. Guiney, Tucker; James Sepelak, Lawrenceville, all of Ga.

[73] Assignee: Siemens Energy & Automation, Inc., Alpharetta, Ga.

[21] Appl. No.: 688,018

[22] Filed: Apr. 19, 1991

[51] Int. Cl.[5] .............................................. H02D 1/18

[52] U.S. Cl. .................................... 361/432; 361/331

[58] Field of Search ................ 361/331, 334, 342-345, 361/359-360, 426, 430, 432

[56] References Cited

U.S. PATENT DOCUMENTS 2,186,640 1/1940 Jirka et al. .......................... 361/343

4,685,028 8/1987 Miller et al. ........................ 361/344

*Primary Examiner*—Gregory D. Thompson

[57] ABSTRACT

The invention provides a fuse clip guard and load shield for an electrical switch assembly of the type having a generally planar base and a pair of longitudinally extending substantially parallel insulating walls defining a longitudinally extending space for containing an electrical load terminal and a fuse clip. The fuse clip guard and load shield each have a lid portion pivotally mounted between the pair of walls and a gripping portion which may include a tab restricting movement of a fuse ejector handle.

20 Claims, 3 Drawing Sheets

FUSE EJECTOR GUARD AND TERMINAL SHIELD

TECHNICAL FIELD OF THE INVENTION

The present invention relates to a fuse ejector guard and terminal shield for a heavy duty electric switch assembly of the type suited for load switching in commercial or industrial use.

BACKGROUND OF THE INVENTION

Various types of electrical assemblies, such as switches, circuit breakers and the like have been developed for use in commercial lighting, thermal units, or motors drawing currents of hundreds of amperes. The assemblies are designed to tolerate or reduce arcing, which may occur between terminals. Some assemblies feature removable terminals, such as lugs, fuse clips or other conducting means. Such assemblies usually have sufficient space surrounding the terminals to permit a worker to obtain access to the terminals to remove or replace them. In some environments, easily accessible terminals carrying live current may be undesirable.

Therefore, it is a principal object of the present invention to provide one or more shields or guards which hinder access to terminals and fuse clips. A further object of the present invention is to prevent inadvertent or unintentional ejection of an end of a fuse from the fuse clip.

SUMMARY OF THE INVENTION

The present invention overcomes the disadvantages of the prior art and achieves the foregoing and other objects by providing a shield for an electrical assembly of the type having a generally planar insulating base, first and second spaced, upwardly and longitudinally extending substantially parallel insulating walls which define therebetween a longitudinally extending space with at least one electrical conductor mounted in the longitudinally extending space. The shield comprises at least one lid portion sized to cover a predetermined part of the longitudinally extending space including at least one electrical conductor, means for pivotally mounting the lid between the first and second spaced, upwardly and longitudinally extending substantially parallel insulated walls. So mounted, the lid portion may pivot between a closed position wherein the lid substantially prevents access to the electrical conductor and an open position wherein the lid permits access to the electrical conductor. The shield further includes a gripping portion extending from the lid for pivoting the shield between the closed position and the open position, although the end of the lid portion may act as the gripping portion.

Advantageously, the shield may comprise first and second lid portions each sized to cover a predetermined part, such as about one half, of the longitudinally extending space. Thus, in one embodiment, the terminal shield would cover—and when closed substantially prevent access to—the line terminal. The second lid portion would cover the remaining portion of the longitudinal space including the second conductor assembly and a fuse clip. As with the first lid portion, the second lid portion may pivot from a first position wherein the second lid substantially prevents access to the second conductor assembly and an open position which permits access to the second conductor assembly. Once again, a gripping portion may extend from the second lid. The lid which covers the fuse clip, also referred to as a fuse ejector guard, prevents access to the fuse clip. At the same time, the fuse ejector guard preferably engages a fuse ejector handle to prevent accidental or inadvertent activation of a fuse ejector handle, and thus removal of the fuse. To accomplish this, the gripping portion of the fuse clip guard preferably includes a tab restricting movement of the fuse ejector lever or handle when the fuse clip guard is in the closed position, to prevent inadvertent handling or ejection of the fuse.

The invention further contemplates, in another embodiment thereof, a shield for protecting against inadvertent access to a longitudinally extending space in an electrical switch assembly. As in the first embodiment, the longitudinally extending space is defined by first and second substantially parallel spaced insulating walls extending upward from an insulating base. The base has an electrical switch positioned outside the longitudinally extending space. The first and second insulating walls each include an aperture in opposed relation. The shield comprises a first lid portion sized to cover at least a part of the longitudinally extending space; a gripping portion extending at a bias from the lid at one end thereof and having a tab for substantially preventing unintentional activation of a fuse ejector handle mounted for rotational movement on the base. The electrical switch assembly also preferably includes an interlock to prevent access to the longitudinally extending space. The interlock may be in the form of an overlap or protrusion, which prevents opening the fuse ejector guard or the terminal shield when the electric switch assembly has current flowing through the switch.

BRIEF DESCRIPTION OF THE DRAWINGS

Further features and advantages of the present invention will become apparent upon reading the following detailed description of preferred embodiments taken in connection with the accompanying drawings in which.

DETAILED DESCRIPTION OF THE DRAWINGS

Figure 1:
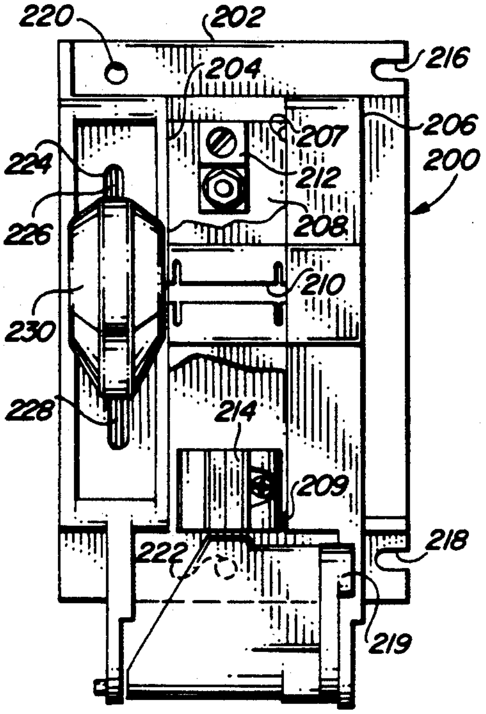
FIG. 1 is a top view of an example of an electrical assembly in which the terminal shield or fuse ejector guard of the present invention may be installed.

The present invention relates to a terminal shield and fuse ejector guard for an electrical safety switch assembly of the type shown schematically in FIG. 1, and generally designated by the reference numeral 200. The electrical switch assembly 200 has a generally planar insulating base 202 and first and second spaced, upwardly and longitudinally extending substantially parallel insulating walls mounted thereon 204, 206. The first and second spaced apart longitudinally extending insulated Walls 204, 206 define therebetween a longitudinally extending space 208 which may be bifurcated or divided by a partition 210 in order to prevent arcing or shorting between adjacent terminals.

The longitudinally extending space 208 defined by the first and second walls 204, 206 has mounted therein at least one electrical conductor, such as a terminal lug 212 or a fuse clip 214. The fuse clip 214 captures one end (not shown) of a standard high current industrial fuse. The other end of the fuse (not shown) inserts into another fuse clip (not shown) mounted at a predetermined distance from the first fuse clip 214. The base 202 includes means for mounting the electrical assembly such as cutouts 216, 218 and holes 220, 222 for receiving screws, bolts or other fasteners. Thus the switch assembly 200 may be mounted on a wall (not shown) or other surface (not shown) as suggested by FIGS. 1, 2 and 7. The switch assembly 200 also includes a slot 224 having an electrical contact area (not shown) mounted therein and connected to the terminals 212, 214. These terminals 212, 214 mate with contact area 226, 228 on plunger arm 230 to complete or break an electrical circuit. In typical applications, the plunger arm 230 is actuated with a switch mechanism, often including a drive rod or a bale coupled thereto (not shown).

The details of the construction of a preferred embodiment of an electrical switch assembly for use with the present invention are disclosed in copending, coassigned U.S. patent application Ser. No. 07/502,370, filed Mar. 30, 1990, now U.S. Pat. No. 5,072,081 the entire contents of which are hereby incorporated by reference and made a part of this application.

Figure 2:
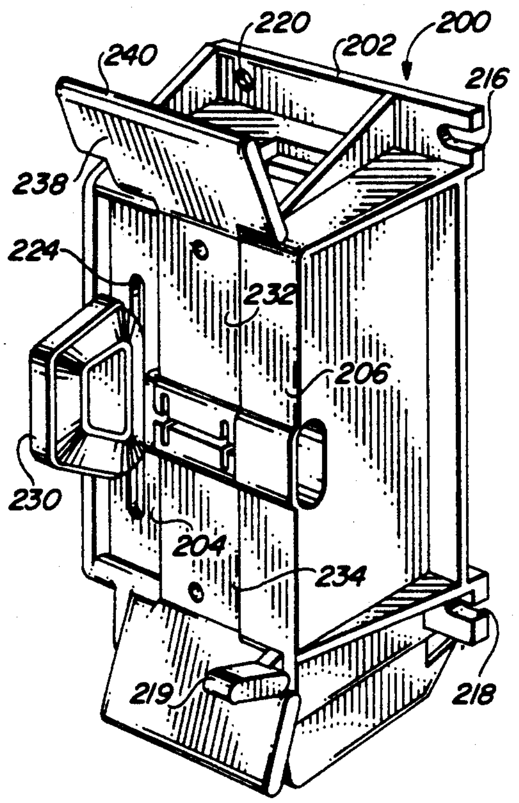
FIG. 2 is a perspective view of an electrical assembly of FIG. 1 having the terminal shield and fuse ejector guard of the present invention installed thereon.

FIG. 2 illustrates the switch assembly 200 described above having pivotally mounted thereon a terminal shield 232 and a fuse ejector guard 234 in accordance with the present invention. As shown in FIG. 2, the terminal shield 232 and fuse ejector guard 234 may be essentially identical and pivotally mounted on the electric switch assembly 200 opposite one another to cover different portions of the longitudinally extending space 208 (see FIG. 1). To avoid duplication of discussion, it will be assumed that the terminal shield 232 and fuse ejector guard 234 are essentially identical in the embodiment described unless stated otherwise. Of course, the overall shape or operation of the fuse ejector guard 234 may differ from that of the terminal shield 232 according to design preferences of a person of ordinary skill in the art.

Figure 3:
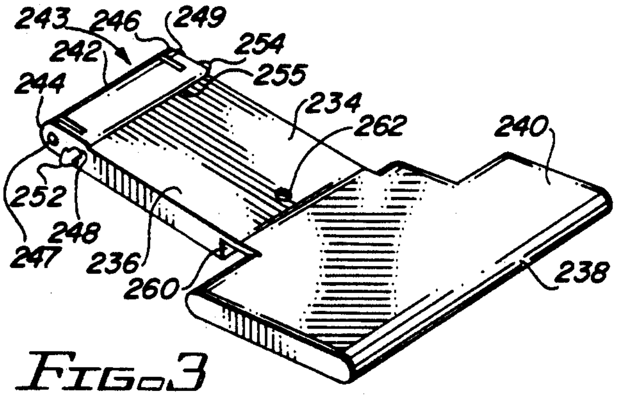
FIG. 3 is an isometric view of a preferred embodiment of a terminal shield or fuse ejector guard in accordance with the present invention.
Figure 4:
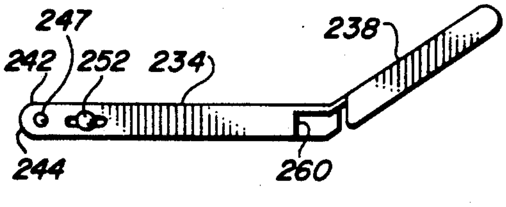
FIG. 4 is a side view of the terminal shield or fuse ejector guard of FIG. 3.
Figure 5:
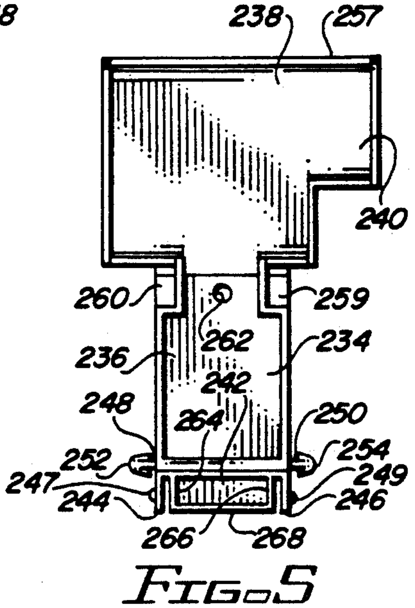
FIG. 5 is a bottom view of the terminal shield or fuse ejector guard of FIG. 3.

The fuse ejector guard 234, illustrated in FIGS. 3, 4 and 5, includes four principal parts: a lid portion 236, a gripping portion 238, a tab portion 240, and pivoting means 243. The lid portion 236 covers a predetermined part of the longitudinally extending space 208 FIG. 1) including at least one preferably removable terminal, in this instance a fuse clip 214 (FIG. 1), although the lid 236 may be sized to cover a portion of the longitudinally extending space 208 which includes the line terminal lug 212. Alternatively, the lid 236 may be sized such that it substantially covers the entire longitudinally extending space 208 in the electric switch assembly 200, including both the line terminal lug 212 and the fuse clip 214. In such case, the lid portion 236 would be elongated, and the pivoting means 243 would be mounted near one edge of the base 202.

The fuse ejector guard 234 further includes the gripping portion 238, which is preferably biased with respect to the lid portion 236, as best shown in FIG. 4, to keep an operator's hand away from live current carrying parts. Preferably, the gripping portion 238 includes a tab 240 which cooperates with a fuse ejector handle 219 (shown in FIGS. 1, 2, 6 and 7). As will be more fully explained below in conjunction With the discussion of FIG. 6, the tab 240 cooperates with the fuse ejector handle 219 to prevent inadvertent, accidental or unintentional ejection of a fuse (not shown). The details of the construction of the fuse ejector handle system preferred for use in the electrical assembly including the present invention, may be found in copending, coassigned U.S. patent application Ser. No. 584,230, filed on Sep. 18, 1990, now U.S. Pat. No. 5,052,952 the entire contents of which is hereby incorporated by reference and made a part hereof.

Figure 6:
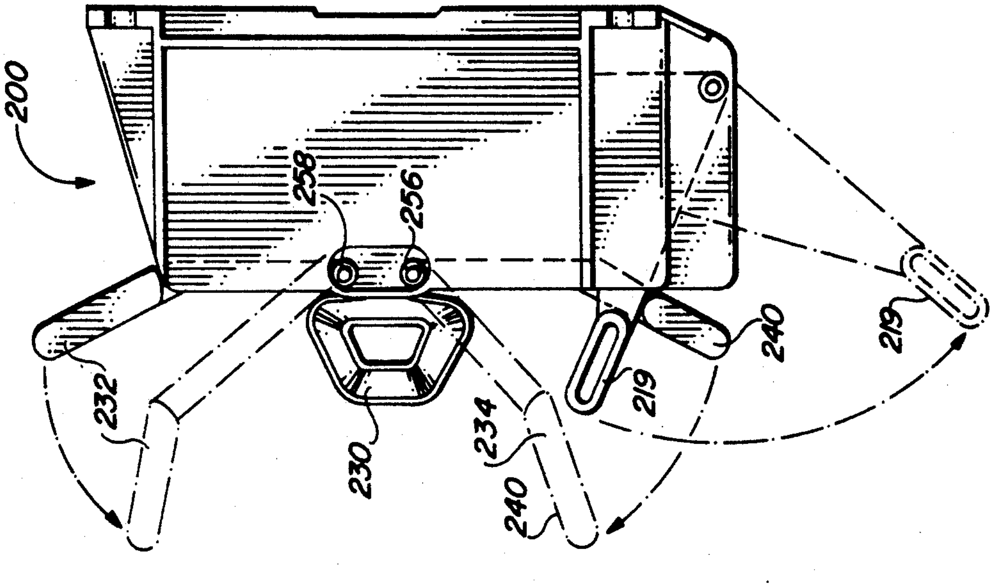
FIG. 6 is a side view of the electrical assembly of FIG. 2 including the fuse ejector guard and terminal shield of the present invention.

The fuse ejector guard 234 has at one end thereof 242 a pivoting means 243, as shown in FIG. 4. The pivoting means 243 may be any of a number of pivots, bosses, or other fastening mechanisms known to those of ordinary skill in the art, but preferably includes the mounting means best illustrated in FIG. 5. Referring to FIG. 5, a pair of deformable ears 244, 246 extend longitudinally from the end 242 of the fuse ejector guard 234. Deformable pins 247, 249 extending therefrom which cooperate with depressions (not shown) on longitudinal walls so that the pins 247, 249 act as detents to stop the fuse ejector guard 234 at an open and closed position (FIG. 6). Necks 248, 250 extend substantially perpendicularly from lid portion 236 adjacent end 242, preferably in line with ridge 255. Each neck 248, 250 terminates with a deformable arrow-shaped head 252, 254, as shown in FIGS. 3 and 5, sized to engage recesses or apertures 256, 258 provided in first and second insulating walls 204, 206 (FIG. 6). Preferably, the heads 252, 254 should be the shape of an arrowhead, with the base of the arrowhead sized to be wider than the aperture to make the lid 236 difficult to remove, thereby decreasing the likelihood that the shields can be removed or defeated by an operator once installed.

The reverse side of the fuse ejector guard 234, as illustrated in FIG. 5, has recesses molded therein in order to reinforce the guard 234 and to improve the manner in which it seats in a closed position when in the longitudinally extending space 208 FIG. 1). Thus, a rib 257 is molded around the periphery of the reverse side of the fuse ejector guard 234. The rib 257 is recessed on both sides of the lid portion 236 adjacent the gripping portion 238. These recesses 259, 260 in the rib 257 permit the lid 236 to lie flush with the top of longitudinally extending walls 204, 206 by permitting the underside of the lid 236 to rest on screws or bosses 207, 209 protruding from the second insulating wall 206 as shown in FIG. 1. The screws or bosses 207, 209 prevent the fuse ejector guard 234 from rotating or pivoting past the screw or boss 207, 209 mounted on the first and second insulating walls 204, 206. Additionally, the fuse ejector guard 234 (or line terminal shield 232) may include an aperture 262 in the lid portion 236. An additional pair of reinforcing ribs 264, 266 extend from the lid portion 236 to the rear edge 268 of the lid portion 236.

The terminal shield 232 and fuse ejector guard 234 of FIGS. 3 through 5 can be installed on the electric switch assembly 200 quite easily. Their installation can be understood by reference to FIGS. 3, 5 and 6. A terminal shield 232 or a fuse ejector guard 234 is positioned so that one of the heads 252, 254 rests against one of the apertures or recesses in the first and second longitudinally extending walls, such as the aperture or recess 256 on the second insulating wall 206. Pressure is gently exerted to force the head 252 through the aperture 256 on the second wall 206. The same procedure is followed to insert the other head 254 on the opposite side of the terminal shield 232 or fuse ejector guard 234 into the aperture (not shown) on the first insulated wall 204. Having inserted both heads 252, 254 through the apertures, the terminal shield 232 or fuse ejector guard 234 should be able to pivot freely between a closed position and an opened position, as shown in FIG. 6. The opened and closed positions are defined in part by pins 247, 249 which cooperate with depressions (not shown) on the first and second insulated walls to act as detents. Thus, once installed, the terminal shield 232 and fuse ejector guard 234 pivot freely through a roughly 90° arc, clicking and stopping at the beginning and end of the arc.

The installation process may be repeated in embodiments using both a line terminal shield 232 and fuse ejector guard 234. It should be evident to a person of ordinary skill that the arrow shaped heads 252, 254 make the fuse ejector guard 234 and terminal shield 232 difficult for an operator to remove. Although the heads 252, 254 can be forced backward through their respective apertures, usually this will require deliberate effort using a screwdriver, for example. Thus, unlike some prior electrical assemblies with removable covers, the pivotable closures of the present invention ordinarily need not be removed to gain access to a terminal or fuse clip.

The operation of the embodiment shown in FIGS. 2–5 can best be understood by reference to FIG. 6. On the right hand side of the electric switch assembly 200 including the present invention, the tab 240 of the fuse ejector guard 234 in closed position interlocks with the fuse ejector handle 219 to prevent an operator from accidentally pivoting the fuse ejector handle 219 so as to accidentally eject a fuse (not shown). In other words, tab 240 prevents travel of the fuse ejector handle 219 when the fuse ejector guard 234 is in the closed position, i.e., lid portion 236 is resting against screw or boss 209 as shown in FIGS. 1 and 5. If the operator desires to change or remove a fuse, the operator merely pivots the fuse ejector guard 234 from the closed position to the open position which allows access to the fuse and pivotal movement of the fuse ejector handle 219 dislodging the fuse (not shown), as described in copending, coassigned U.S. patent application Ser. No. 584,230, filed on Sep. 18, 1990. Tab 240 is sized so that the fuse ejector guard 234 can pivot freely between closed and opened positions without catching fuse ejector handle 219. Similarly, the terminal shield 232 pivots between closed and opened positions, as shown in FIG. 6. The open position permits access to the line terminal lug 212 (shown in FIG. 1) for repairs, adjustments, replacements, and installations, while hindering or substantially preventing access at other times.

The terminal shield 232 and fuse ejector guard 234 of the present invention may be molded or formed of any resilient yet relatively rigid thermoplastic material, such as the general class of acetyl copolymers. In accordance with the presently preferred embodiment, however, the acetyl copolymer marketed by Du Pont under the Delrin trademark should preferably be used.

Figure 7:
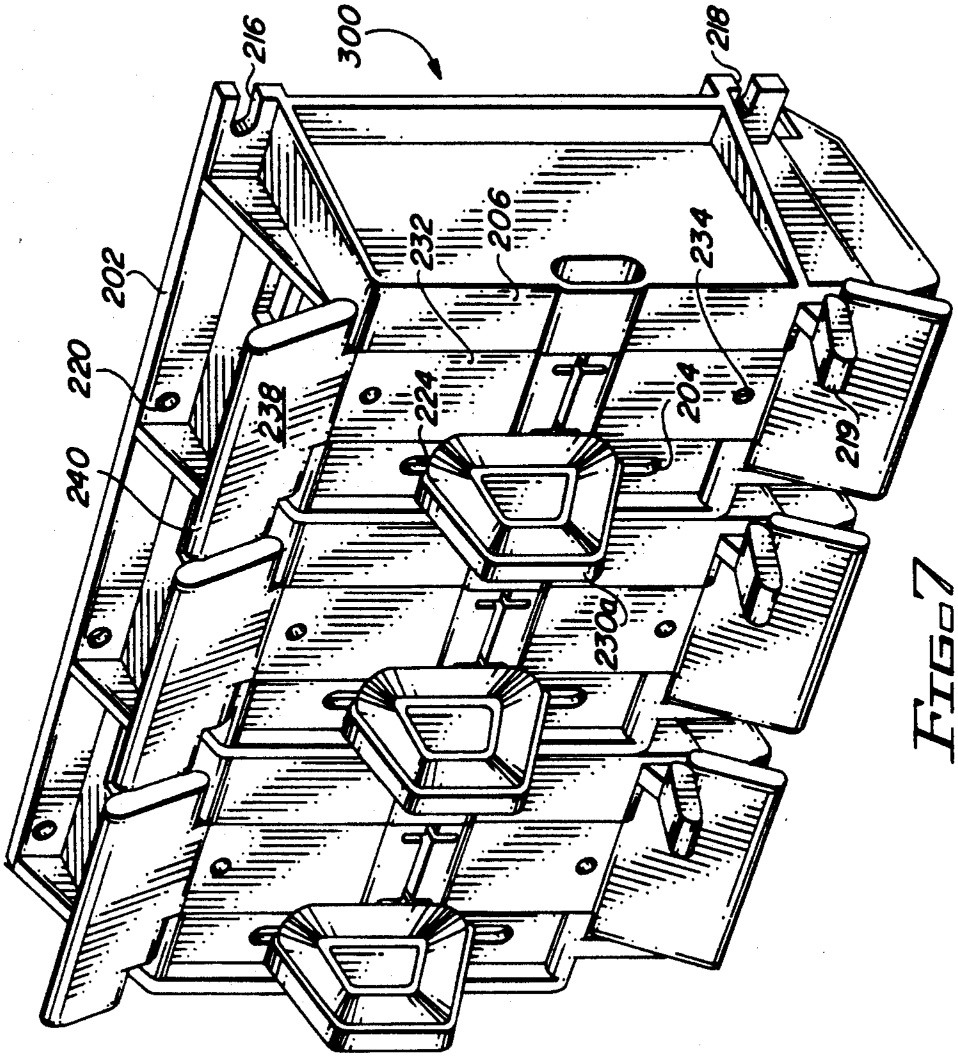
FIG. 7 is a perspective view of another preferred embodiment of three of the switch modules of FIG. 2 in ganged relationship.

FIG. 7 illustrates an alternative embodiment 300 of the present invention which includes an additional interlock mechanism to prevent opening of the guards 232 and 234 when the circuit has current flowing through it. The alternative embodiment of the electric switch assembly 300 shown in FIG. 7 is illustrated as including three switch assemblies ganged together, however, it should be understood any of the embodiments described herein may include a single switch assembly or two or more switch assemblies ganged together. The alternative embodiment shown in FIG. 7 is in most respects the same as the embodiment shown in FIGS. 2–5, the most important difference being the additional interlock feature.

Figure 8:
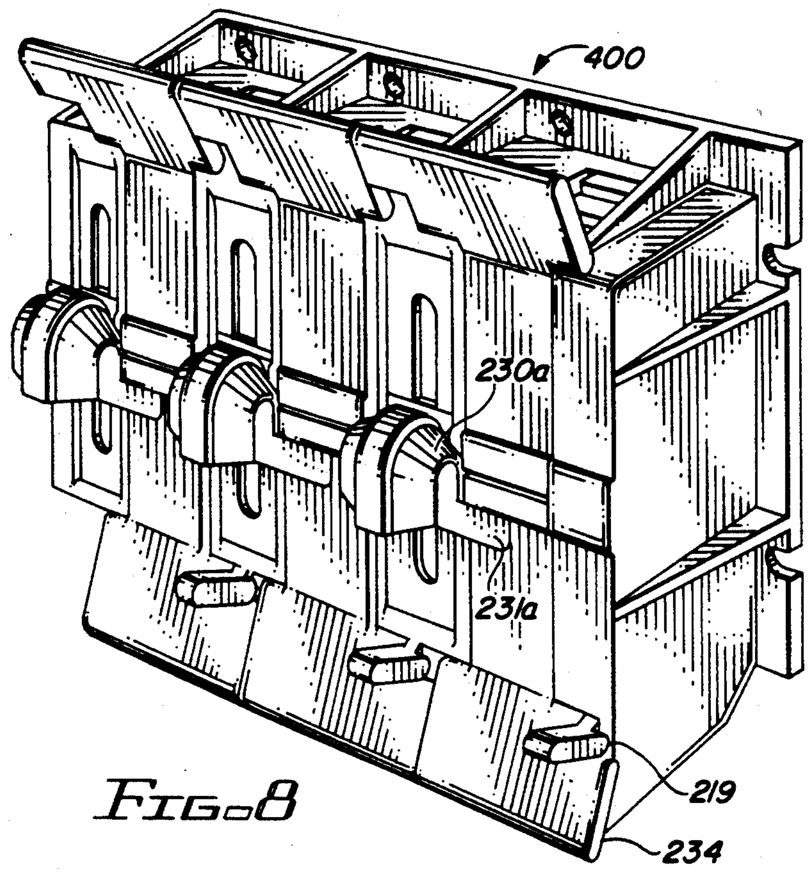
FIG. 8 is a perspective view of yet another preferred embodiment of three of the switch modules of FIG. 2 in ganged relationship.
Figure 9:
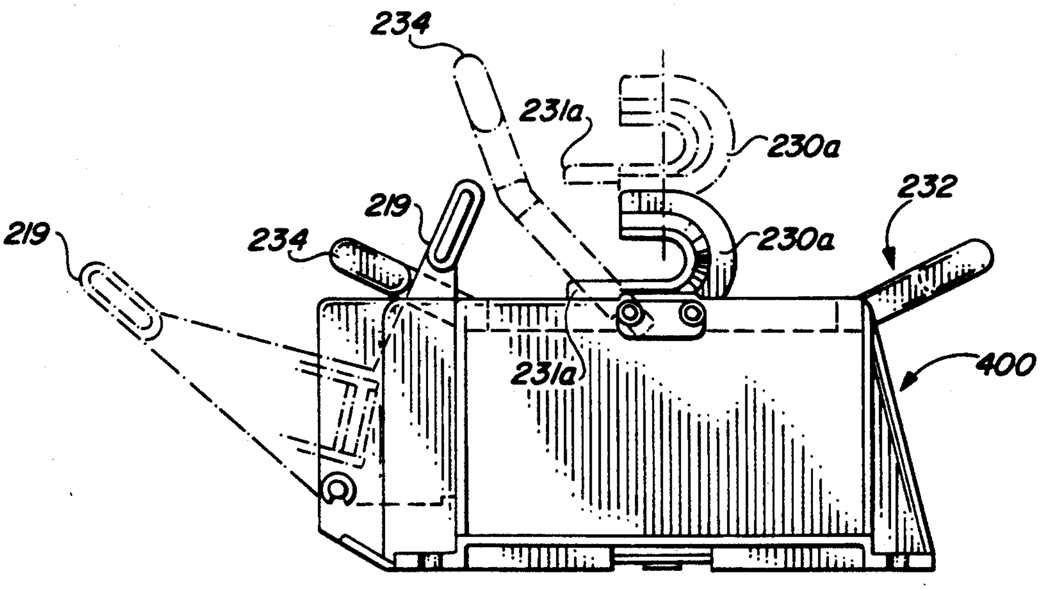
FIG. 9 is a side view of the electrical assembly of FIG. 8.

As shown in FIG. 7, the actuator 230*a*, which may be a plunger, pushbutton, or other activation device, overlaps the line shield 232 and fuse ejector guard 234 in the closed position. This may be a protrusion 231 in the plunger 230*a* handle as shown in FIG. 7, or as shown in the switch 400 of FIGS. 8 and 9, a tab or prong 231*a* (or other equivalent mechanism) which prevent pivoting of the terminal shield 232 or the fuse ejector guard 234, or both, while the plunger 230*a* is in place allowing current to flow through the switch assembly 300. Only by withdrawing plunger 230*a* and thereby interrupting the electric circuit and flow of electricity, can one operate the load shield 232 or fuse clip guard 234 in the embodiment shown in FIG. 7. Importantly, when plunger 230*a* is inserted into slot 224 to close the circuit permitting current to flow, the terminal shield 232 and fuse ejector guard 234, if not already closed, are forced into a closed position, so that the longitudinally extending space 208 (see, e.g., FIG. 1) remains covered when the switch zoo has current flowing through it.

The operation of the embodiment shown in FIG. 7 is substantially the same as the operation of the embodiment described in the discussion of FIG. 6, with one notable and advantageous difference. While the terminal shield 232 and fuse ejector guard 234 pivot in much the same manner in the embodiment of the electric switch assembly 300 shown in FIG. 7, the protrusion 231 on the switch actuating plunger 230*a* prevents substantial pivoting movement of either the terminal shield 232 or the fuse ejector guard 234 when the plunger 230*a* is in place (allowing current to flow through the electric switch assembly 300). Withdrawing the plunger 230*a* by pulling it up in the slot 224 interrupts the electrical circuit and permits either the terminal shield 232 or the fuse ejector guard 234 to be pivoted freely to allow access to the longitudinally extending space (not shown) containing the terminal (not shown) and the fuse ejector handle 219. As shown in the alternate switch embodiment 400 of FIGS. 8 and 9, the protrusion 231*a* may be constructed so that it prevents substantial movement of either or both of the terminal shield 232 or fuse ejector guard 234.

The foregoing description of the preferred embodiments is intended to illustrate, without limitation, the present invention. Many modifications, and changes will be apparent to those of ordinary skill in the art upon reading the detailed description of the preferred embodiments. For example, different means for pivotally mounting the fuse ejector guard or terminal shield may be employed. Also, the terminal shield and fuse ejector guard can be combined into a single unit which covers the longitudinally extending space and pivots from one end of the electric switch assembly. It is therefore intended that all such changes, variations, modifications and equivalents be construed to be within the scope of the present invention which is defined in the following claims.

We claim:

1. A shield for use in an electrical assembly of the type having a generally planar insulating base, first and second spaced, upwardly and longitudinally extending substantially parallel insulating walls to define therebetween a longitudinally extending space; at least one electrical conductor mounted in the longitudinally extending space, and a moveable fuse ejector handle coupled to the electrical assembly, the shield comprising:

at least one lid portion for covering a predetermined part of the longitudinally extending space, including the at least one electrical conductor of the electrical assembly;

means adapted to mount the lid portion for pivotal movement between the first and second spaced, upwardly and longitudinally extending substantially parallel insulating walls of the electrical assembly, such that the lid may pivot between a closed position where the lid prevents access to the electrical conductor and an open position wherein the lid permits access to the electrical conductor; and a gripping portion extending from the lid portion for pivoting the shield between the closed position and the open position, wherein the gripping portion includes a tab, said tab extending from the gripping portion, said tab for blocking movement of the fuse ejector handle of the electrical assembly thereby preventing inadvertent ejection of a fuse.

2. A shield in accordance with claim 1 wherein the shield prevents inadvertent removal of a fuse from a fuse clip.

3. A shield in accordance with claim 1 wherein the gripping portion extends from the lid portion at a bias with respect to the lid portion.

4. An electrical switch assembly comprising:

a generally planar insulating base, first and second spaced upwardly and longitudinally extending substantially parallel insulating walls to define therebetween a longitudinally extending space, first and second electrical conductors mounted in the longitudinally extending space, and an electric switch adjacent the longitudinally extending space;

a shield having:

a first lid portion for covering a predetermined part of the longitudinal space including the first electrical conductor;

first means adapted to mount the first lid portion between the first and second insulating walls such that the first lid portion may pivot from a closed position wherein the first lid portion prevents access to the first electric conductor and an open position which permits access to the first electric conductor;

a first gripping portion extending from the first lid portion for gripping the first lid portion in order to pivot the first lid portion between the closed position and the open position;

a second lid portion for covering a remaining portion of the longitudinally extending space including the second electric conductor;

second means adapted to mount the second lid portion between the first and second insulating walls so that the second lid portion may pivot from a first position wherein the second lid portion prevents access to the second electrical conductor and an open position which permits access to the second electrical conductor; and a second gripping portion extending from the second lid portion for gripping the second lid portion in order to pivot the second lid portion between the closed position and the open position.

5. A switch assembly in accordance with claim 4 wherein one of the first and second electrical conductors capture one end of a fuse.

6. A switch assembly in accordance with claim 5 wherein one of the first and second electrical conductors is a lug.

7. A switch assembly in accordance with claim 5 wherein the shield prevents inadvertent removal of a fuse.

8. A switch assembly in accordance with claim 4 wherein the first gripping portion is biased with respect to the first lid.

9. A switch assembly in accordance with claim 8 wherein the second gripping portion is biased with respect to the second lid.

10. An electrical switch assembly comprising:

a generally planar insulating base, first and second spaced apart substantially parallel walls extending a predetermined distance upwardly from the base, the first and second walls defining therebetween a longitudinally extending space; an electric switch included in the base outside the longitudinally extending space, a lug and a fuse clip mounted in spaced relationship within the longitudinally extending space, and a fuse ejector lever adjacent the fuse clip and rotatable between a first inactive position and a second active position wherein rotating the lever causes one end of a fuse to dislodge from the fuse clip;

a shield having:

a first lid portion for covering a predetermined part of the longitudinally extending space including the lug;

first means adapted to pivotally mount the first lid portion between the first and second insulating walls such that the first lid portion pivots from a closed position wherein the first lid portion prevents inadvertent access to the lug to a second position to allow access to the lug;

a first gripping portion extending from the first lid portion for gripping the first lid in order to pivot the first lid portion between the open and closed positions;

a second lid portion for covering a remaining portion of the longitudinally extending space including the fuse clip;

means adapted to pivotally mount the second lid portion between the first and second insulating walls such that the second lid portion pivots from a closed position wherein the second lid portion shields the fuse clip; and a second gripping portion extending from the second lid portion, for pivoting the second lid portion between the closed position and the open position, the second gripping portion including a tab restricting movement of the fuse ejector lever when the second lid portion is in the closed position, thereby preventing inadvertent ejection of a fuse.

11. A switch assembly in accordance with claim 10 wherein the first gripping portion is biased with respect to the first lid.

12. A switch assembly in accordance with claim 11 wherein the second gripping portion is biased with respect to the second lid.

13. An electrical switch assembly including a generally planar base, the longitudinally extending space defined by first and second substantially parallel spaced insulating walls extending upwardly from the base, the base including an electrical switch having an actuator positioned outside said space, the first and second walls each including first and second apertures in opposed relation;

a shield having:

a first lid portion for covering at least a portion of said longitudinally extending space, the first lid portion pivotally mounted in the first and second apertures between the first and second insulated walls; and an interlock coupled to said electrical switch actuator for preventing pivoting of said first lid portion when current flows through said actuator; and a gripping portion extending from the first lid portion for pivoting the shield between the closed position and the open position wherein the gripping portion includes a tab, said tab extending from the gripping portion, said tab for blocking which block movement of a fuse ejector handle preventing inadvertent ejection of a fuse.

14. A switch assembly in accordance with claim 13 wherein the first lid portion covers a fuse clip.

15. A switch assembly in accordance with claim 13 wherein the first lid portion covers a lug.

16. A switch assembly in accordance with claim 13 wherein the lid comprises an insulating thermoplastic.

17. The electrical switch assembly in accordance with claim 13, the shield further comprising:

a gripping portion extending at a bias from the first lid portion at one end thereof and having a tab for preventing unintentional activation of a fuse ejector handle mounted from rotational movement on the base;

a second lid portion and gripping portion substantially identical to said first lid portion and gripping portion, and having second means for pivotally mounting the second and lid portion in third and fourth opposed apertures included in said first and second insulating walls adjacent the first and second apertures, the second lid and gripping portions for covering a line terminal; and said first and second pivot means extending outwardly on opposite sides of the first and second lid portions for insertion through the first and second apertures in the first and second walls, each of said first and second pivot means having a compressible head and a neck, each compressible head serving to prevent inadvertent removal of the first and second lid portions once each head is inserted through the aperture, each neck acting as a bearing surface when one of the first or second lid portions is rotated.

18. A switch assembly in accordance with claim 13 further comprising:

a second lid portion and gripping portion identical to said first lid and gripping portion, and pivotally mounted in third and fourth opposed apertures included in said first and second insulating walls adjacent the first and second apertures, the second lid and gripping portions for covering a load terminal.

19. A switch assembly in accordance with claim 17 wherein the interlock included in the electrical switch actuator substantially prevents pivoting of said first and second lid portions when current flows through said actuator.

20. A switch assembly in accordance with claim 13 wherein said interlock is a prong, a tab, or an overlap.

* * * * *